July 2, 1963 T. G. GRANRYD 3,095,990
TRANSMISSION CONTROLLED LOADER HYDRAULIC CIRCUIT
Filed March 30, 1961
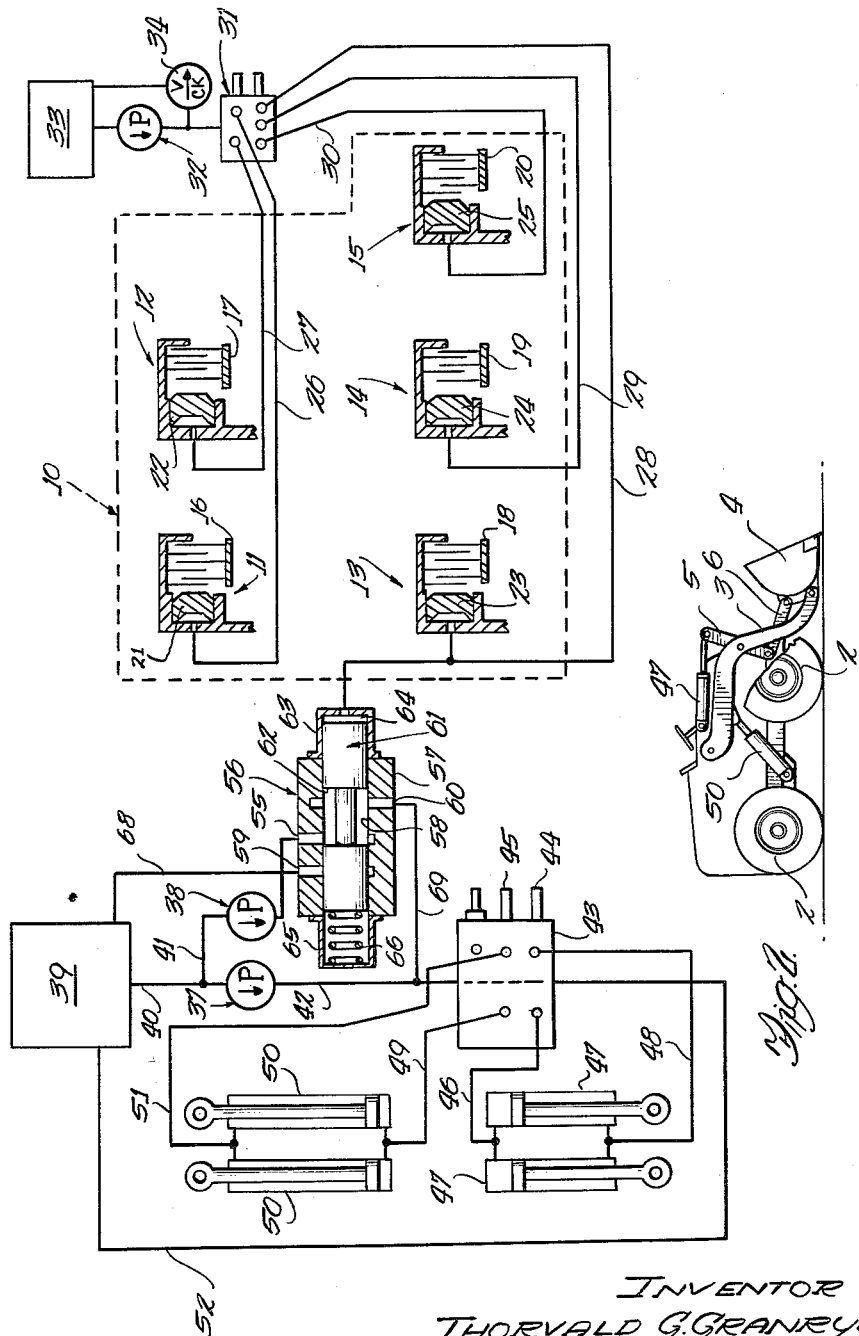
INVENTOR
THORVALD G. GRANRYD
Paul O. Pippel
ATTORNEY

United States Patent Office 3,095,990
Patented July 2, 1963

3,095,990
TRANSMISSION CONTROLLED LOADER
HYDRAULIC CIRCUIT
Thorvald G. Granryd, Libertyville, Ill., assignor to The
Frank G. Hough Co., a corporation of Illinois
Filed Mar. 30, 1961, Ser. No. 99,453
8 Claims. (Cl. 214—140)

This invention relates generally to tractor loaders, and more specifically to an improved hydraulic circuit arrangement for a tractor loader having a hydraulically operated transmission and a hydraulically operated loader construction wherein substantially a maximum utilization of the available power of the tractor engine is used for operation of the tractor and loader.

Tractor loaders as known in the art generally comprise a tractor having a loader or earth-working tool carried thereon and operatively extending forwardly of the tractor. A single power source or engine is provided for operation of the tractor and the loader arrangement. In a hydraulically operated loader arrangement, generally a constant volume pump is provided which is connected to be continuously driven by a power take-off shaft from the engine. In order that the loader arrangement may be operated at a relatively rapid rate it is desirable that the pump be of a relatively large size. A large pump can provide relatively efficient operation of the loader arrangement under conditions wherein the vehicle is moved under relatively light loading conditions since the power delivered to the pump and traction means can only at most equal the maximum power available from the engine. Should the tractor be operated under heavy loading conditions such as into a bank or other obstruction with the transmission in a low speed ratio and with the loader arrangement in operation, an excessive torque reaction could be applied to the engine to cause a stalling thereof. Various solutions to this problem of efficiently matching the power developed by the engine to the power consumed by the loader arrangement and by the tractor in all of the various ordinary operations of the loader arrangement and the tractor have been for one reason or another generally unsatisfactory.

It is the object of the present invention to provide in an arrangement for a tractor, having tool means operated from the tractor engine, means which will effectively balance the power consumed in the two paths with the power available from the engine.

It is a further object of the present invention to provide an automatically operating system for a front end type tractor loader having a hydraulically controlled transmission and a hydraulically operated loader arrangement wherein the system is hydraulically operated to efficiently distribute the available power from the engine to both the loader arrangement and the tractor transmission.

It is a further object of the present invention to provide in a front end type tractor loader having a hydraulically controlled transmission, and having a hydraulically operated loader arrangement, with two hydraulic pumps for operating the loader arrangement and with hydraulic circuit means for controlling the output of the two pumps in a particular manner to produce an efficient tractor loader arrangement.

Other objects and features of the present invention will be apparent upon a perusal of the following specification and drawing, of which:

FIG. 1 is a somewhat diagrammatic view of the subject invention; and

FIG. 2 shows one type of tractor loader to which the present invention may be applied.

The present embodiment is the preferred embodiment, but it is to be understood that changes can be made in the present embodiment by one skilled in the art without departing from the spirit and scope of the present invention.

For a general description of the present invention reference is made to the drawing. Five transmission clutches for three different speed ratios in two directions are shown and are connected to a transmission selector valve which is under the control of the operator of the tractor loader. A pump and reservoir are connected to the transmission selector valve to complete the hydraulic circuit for the control of the transmission. The hydraulic line to one of the clutches, specifically that for the lowest speed ratio, is connected in parallel with an automatically operating hydraulic valve. The automatically operating hydraulic valve is connected in the pressure line of one of the loader pumps and to the loader reservoir. The automatic valve operates to dump the output of one of the loader pumps to the loader reservoir whenever the clutch for the lowest speed ratio is operated. In any other speed ratio position of the transmission, the one loader pump is connected through the automatic valve to deliver hydraulic fluid to the loader selector valve. The other loader pump is directly connected between the loader reservoir and the loader selector valve. The loader hydraulic rams are connected to the loader selector valve. From the foregoing it may be seen that whenever the transmission is in other than the lowest speed ratio, both loader pumps will deliver their output to the loader hydraulic rams. When the transmission is in the lowest speed ratio, only one of the loader pumps is operating to deliver hydraulic fluid to the loader system. The pair of loader pumps are connected to be driven from the engine of the tractor and are of the constant volume type. Thus when the tractor loader is traveling with a relatively small proportion of the available engine power being consumed through the traction means of the tractor, the loader structure is operated by two hydraulic pumps to provide for rapid operation thereof. When the tractor is in the lowest speed ratio, that speed ratio which is often designated as a creeper speed and is commonly used in heavy digging, only one loader pump is operating to deliver hydraulic fluid under pressure to the loader mechanism and although the loading on the traction means may be relatively high the power consumed in the loader circuit is substantially less. The force applied by the loader structure in digging is the same although the speed of operation thereof is substantially lower. This unique arrangement provides for substantially maximum efficiency in the operation of the tractor loader under various conditions of loading with consequently relatively long life of the engine.

Turning next to a detailed description of the present invention, continued reference is made to the drawing. The tractor loader shown in FIG. 2 is one example of the type of machine suitable for the present invention. The tractor body which carries an engine (not shown) comprises wheels 2 supporting the body of the tractor. A boom 3 is pivotally carried at one end thereof on the tractor and extends forwardly thereof. A bucket 4 is pivotally carried on the forward end of the boom. A pair of hydraulic rams 50, one for each side of the tractor, is provided, and each ram 50 is pivotally connected at its head end to the frame of the tractor, and the rod end thereof is pivotally connected to the boom 3 intermediate the ends thereof. Thus, extension of the rams 50 will cause a raising of the bucket 4 and the retraction thereof results in a lowering of the bucket. The bucket 4 is pivotally positioned relative to the boom 3 by a pair of hydraulic rams 47, one for each side of the tractor. The head end of each hydraulic ram 47 is pivotally carried on the tractor and the rod end thereof is pivotally connected to one end of the lever arrangement 5. The lever arrangement 5 is pivotally carried intermediate its ends on the boom intermediate its ends. The lower or other end of the lever arrangement 5 is pivotally connected to a link 6, the other end of which is pivotally connected to the rear side of the bucket 4 at a point spaced from the pivotal connection of the boom 3 thereto. Thus it may be seen that when the hydraulic rams 47 are extended, the lever arrangement 5 is pivoted clockwise, as viewed in FIG. 2, and the bucket 4 is pivoted counterclockwise, as viewed in FIG. 2, by the rearward movement of the link 6. Upon retraction of the hydraulic rams 47, the bucket 4 is pivoted clockwise as viewed in FIG. 2. The clutches for producing the various speed ratios of the transmission 10 are shown and designated as clutch 11 for the forward speed, clutch 12 for the reverse speed, clutch 13 for the first or lowest speed range, clutch 14 for the second speed range, and clutch 15 for the third speed range. Although not shown, it is to be understood that when one of the sets of disks 16 or 17 of either the forward or reverse direction clutches 11 and 12 are coupled with their associated disks, and one of the sets of disks 18, 19, or 20, respectively, of the speed ratio clutches 13, 14, and 15, are coupled with their associated disks, the gearing of the transmission 10 is adjusted for the desired operation. The sets of disks of each clutch are coupled by the application of hydraulic fluid under suitable pressure to the pistons 21, 22, 23, 24 and 25. Hydraulic fluid is delivered to the pistons 21 through 25 respectively by the conduits 26, 27, 28, 29 and 30. Hydraulic fluid is selectively applied to the conduits 26 through 30 by appropriate operations of the transmission selector valve 31. Hydraulic fluid under pressure is delivered to the transmission selector valve 31 by the transmission pump 32. The pump 32 draws hydraulic fluid from a reservoir 33, and an adjustable relief valve 34 connected between the pressure side of the pump 32 and the reservoir 33 provides the proper hydraulic fluid pressure for operation of the clutches 11 through 15.

The loader arrangement is operated by a pair of hydraulic fluid pumps 37 and 38. All of the pumps 32, 37 and 38 are of a constant volume type and are driven in parallel from the same engine or power source that drives the transmission of the tractor. The pumps 37 and 38 need not be of the same size. The suction side of pump 37 is connected to reservoir 39 by conduit 40. The suction side of pump 38 is also connected to conduit 40 by a conduit 41. The pressure side of pump 37 is connected to conduit 42, the other end of which is connected to the loader selector valve 43. By appropriate operation of the valve spools 44 and 45 of the loader selector valve 43, hydraulic fluid may be separately or simultaneously delivered in either direction over either of the following two circuits: firstly, from conduit 46 to the head end of the pair of hydraulic rams 47 and from the rod end of the pair of hydraulic rams 47 through conduit 48 to the valve 43; and secondly, from conduit 49 to the head end of the pair of hydraulic rams 50 and from the rod end of the pair of hydraulic rams 50 through the conduit 51 to the valve 43. The valve 43 is also connected to the reservoir 39 by conduit 52 so that when either the head end or rod end of the pairs of hydraulic rams 47 and 50 are connected to receive hydraulic fluid under pressure, the other end of those rams are vented to the reservoir 39 through conduit 52. Valve 43 is further constructed to vent the hydraulic fluid under pressure from conduit 42 to the reservoir 39 through conduit 52 when the valve spools 44 and 45 are in a neutral position wherein no hydraulic fluid under pressure is delivered to either of the pairs of hydraulic rams 47 or 50.

The pressure side of pump 38 is connected to a port 55 of valve 56. Valve 56 comprises a valve body 57 having a valve bore 58 formed therethrough. Ports 55, 59 and 60 are formed through the valve body 57 into the valve bore 58 at certain positions spaced longitudinally of the valve bore 58. A valve spool 61 is slidably carried in valve bore 58. Valve spool 61 is provided with an annular groove 62 somewhat at the longitudinal center thereof. One end of the valve bore 58 is closed by a cap 63 which with one end of the valve spool 61 defines a chamber 64. Conduit 28, which has previously been described as connected to the clutch 13 for the first speed ratio of the transmission, is also connected into chamber 64 so that any hydraulic fluid under pressure in conduit 28 is applied into chamber 64 against the end of the valve spool 61. The other end of the valve bore 58 is closed by a cap 65 and a coiled spring 66 is carried in the cap 65 and biases the valve spool 61 toward cap 63. The valve spool 61 is so formed relative to the ports 55, 59 and 60 that in the position shown in the drawing, that in which no hydraulic fluid under pressure is applied to chamber 64, port 55 is connected to port 60 through valve bore 58 and about annular groove 62, and port 59 is blocked by valve spool 61. When the clutch 13 for the first speed ratio is energized by hydraulic fluid under pressure in conduit 28, the valve spool 61 is moved against the bias of spring 66 toward cap 65, and port 59 is connected to port 55 through valve bore 58 and about annular groove 62, while port 60 is blocked by the valve spool 61. Port 59 is connected by conduit 68 to the reservoir 39, and port 60 is connected by conduit 69 to conduit 42. Thus it may be seen that when the valve spool 61 is in the position shown in the drawing, the pressure side of pump 38 is connected to the pressure side of pump 37 through valve 56 and conduit 69. Further, when the clutch 13 for the first speed ratio is energized, conduit 69 is blocked at the valve 56 and the pressure side of the pump 38 is connected to the reservoir 39 through the valve 56 and conduit 68.

From the foregoing description of the present invention it will be seen that in any speed range of the tractor other than the first speed ratio, both of the pumps 37 and 38 are in the operating circuits for the hydraulic rams 47 and 50 of the loader mechanism. When the loading on the tractor is relatively light, the tractor engine power is divided simultaneously between the traction means and the two pumps 37 and 38. When the transmission is in the low speed range, that which is used when loading on the tractor is relatively high, the pump 38 is vented to the reservoir 39 and the power developed by the tractor engine is divided between the traction means and pump 37. Under this operated condition of the present invention the loader hydraulic rams 47 and 50 may be operated with the same force that is applied when both pumps 37 and 38 are operating, but at a substantially reduced speed because of the reduced flow resulting from the operation of one pump as compared to two pumps. Since the valve 56 is operated automatically with the operation of the transmission selector valve 31, a unique tractor loader arrangement is provided wherein excellent matching of the multiple power consumers to the power available is provided.

Having described the invention, what is considered new and desired to be protected by Letters Patent is:

1. In a tractor loader having traction means and tool means operated by a single engine, means for distributing the available power from said engine to said traction means and said tool means in different proportions, comprising transmission means for selectively connecting power from said engine to said traction means at different speed ratios, means connected to said engine and to said tool means to deliver a certain amount of power to said tool means, second means connected between said engine and said tool means for delivering an additional amount of power from said engine to said tool means, and means associated with said transmission means and operating responsive to the selective connection of power from said engine to said traction means at the lowest speed ratio for disconnecting said second means from said tool means.

2. In a tractor loader having traction means and hydraulically operated tool means operated by a single engine, means for distributing the available power from said engine to said traction means and said tool means in different proportions, comprising transmission means for selectively connecting power from said engine to said traction means at different speed ratios, hydraulic pump means connected to said engine and to said tool means to deliver a certain amount of the available engine power to said tool means, second hydraulic pump means connected to said engine and to said tool means in parallel with the connection of said first pump means for delivering an additional amount of power from said engine to said tool means, and means associated with said transmission and operating responsive to the selective connection of power from said engine to said traction means at the lowest speed ratio for venting said second pump means.

3. In a tractor loader having traction means and hydraulically operated tool means operated by a single engine, means for distributing the available power from said engine to said traction means and said tool means in different proportions, comprising transmission means for selectively connecting power from said engine to said traction means at different speed ratios, a first hydraulic pump connected to said engine in parallel with the connection of said transmission means to said engine and connected to deliver a certain amount of the available engine power to said tool means, a second hydraulic pump connected to said engine in parallel of said first pump and said transmission means and connected to said tool means for delivering an additional amount of power from said engine to said tool means, and means associated with said transmission and operating responsive to the selective connection of power from said engine to said traction means at the lowest speed ratio for venting said second hydraulic pump.

4. In a tractor loader having traction means and tool means, a single tractor engine, a selectively variable speed ratio transmission connected between said engine and said traction means for operation of said traction means at different selected speed ratios, a pair of hydraulic pumps connected to said engine to be continually driven thereby for operating said tool means, and means associated with said transmission and operating responsive to the operation of said transmission in the lowest speed ratio for venting one of said pair of pumps.

5. In a tractor loader having traction means and tool means, a single tractor engine, a selectively variable speed ratio transmission connected between said engine and said traction means for operation of said traction means at different selected speed ratios, manually operable means for controlling the operation of said transmission in any one selected speed ratio, a pair of hydraulic pumps connected to said engine to be continually driven thereby for operating said tool means, and means connected to said manual means and operating responsive to the operation of said manual means to control the operation of said transmission in the lowest speed ratio for venting one of said pair of pumps.

6. In a tractor loader having traction means and tool means, a single tractor engine, a selectively variable speed ratio transmission connected between said engine and said traction means for operation of said traction means at different selected speed ratios, hydraulically operated speed ratio shifting means connected to said transmission for controlling the operation of said transmission in one selected speed ratio, a pair of hydraulic pumps connected to said engine to be continually driven thereby for operating said tool means, hydraulic valve means operatively connected to said hydraulically operated shifting means and one of said pair of pumps and said valve means operatively responsive during the operation of said hydraulically operated shifting means for controlling the operation of said transmission in the lowest speed ratio to vent said one of said pair of pumps.

7. In a tractor loader having traction means and tool means, a single tractor engine, a selectively variable speed ratio transmission connected between said engine and said traction means for operation of said traction means at different selected speed ratios, said transmission including a plurality of hydraulic clutches, each of said hydraulic clutches being formed to operate responsive to a hydraulic fluid pressure applied thereto for controlling the operation of said transmission in one of a plurality of different speed ratios, manually operable means for selectively applying hydraulic fluid under pressure to one of said clutches, a pair of hydraulic pumps connected to said engine to be continually driven thereby for operating said tool means, hydraulic valve means connected to one of said hydraulic pumps and operating responsive to a hydraulic fluid pressure applied thereto for venting said one pump, and hydraulic fluid conduit means connecting said hydraulic valve means to the hydraulic clutch for the lowest speed ratio of said transmission for applying hydraulic fluid under pressure to said hydraulic valve means simultaneously with the application of hydraulic fluid under pressure to said clutch for the lowest speed ratio.

8. In a tractor loader having traction means and tool means, a single tractor engine, transmission means including a plurality of hydraulically operated clutches for controlling the operation of said transmission in any one of a plurality of selected speed ratios dependent upon the operation of one of said clutches, a hydraulic valve connected in parallel with a hydraulic fluid pressure conduit to the clutch of said plurality of clutches for the lowest speed ratio of said transmission, said valve being formed to operate responsive to hydraulic fluid under pressure in said conduit, a pair of hydraulic pumps connected to said engine to be continually driven thereby, a second hydraulic valve for controlling the operation of said transmission means, means connecting the output of one of said hydraulic pumps to said first hydraulic valve, said conduit further connecting said first hydraulic valve and said clutch of lowest speed ratio to said second hydraulic valve, said first hydraulic valve being formed to vent hydraulic fluid from said one of said pumps responsive to pressure fluid in said conduit from said second hydraulic valve.

References Cited in the file of this patent
UNITED STATES PATENTS

| | | |
|---|---|---|
| 2,618,932 | Taup | Nov. 28, 1952 |
| 2,842,273 | Granryd | July 8, 1958 |